United States Patent [19]

Vu et al.

[11] Patent Number: 4,855,185

[45] Date of Patent: Aug. 8, 1989

[54] POLYURETHANE COATINGS FOR BRIDGE DECKINGS AND THE LIKE

[75] Inventors: Cung Vu, Gaithersburg; Susan P. Buxbaum, Towson, both of Md.; Norman E. Blank, Heidelberg, Fed. Rep. of Germany; Richard C. Hartwig, Laurel, Md.

[73] Assignee: W. R. Grace & Co.-Conn., New York, N.Y.

[21] Appl. No.: 206,775

[22] Filed: Jun. 15, 1988

Related U.S. Application Data

[60] Division of Ser. No. 141,452, Jan. 7, 1988, Pat. No. 4,788,269, which is a continuation-in-part of Ser. No. 128,956, Dec. 4, 1987, abandoned.

[51] Int. Cl.$^4$ .................. C08G 18/10; C08G 18/30
[52] U.S. Cl. ...................... 428/423.1; 428/425.8; 528/60; 528/67
[58] Field of Search .................. 428/423.1, 425.8; 528/60, 67

[56] References Cited

U.S. PATENT DOCUMENTS

| | | | |
|---|---|---|---|
| 3,515,699 | 6/1970 | Burns et al. | 260/75 |
| 3,725,355 | 4/1973 | Parrish et al. | 252/188.3 |
| 3,993,576 | 11/1976 | Barron | 252/182 |
| 4,145,515 | 3/1979 | Pogozelski et al. | 528/77 |
| 4,225,696 | 9/1980 | Colpitts et al. | 528/76 |
| 4,376,834 | 3/1983 | Goldwasser et al. | 521/159 |
| 4,410,597 | 10/1983 | Nishino et al. | 428/423.1 |
| 4,436,896 | 3/1984 | Okamoto et al. | 525/415 |
| 4,507,336 | 3/1985 | Cenegy | 427/244 |
| 4,532,316 | 7/1985 | Henn | 528/59 |
| 4,551,498 | 11/1985 | Yeater et al. | 524/424 |
| 4,559,239 | 12/1985 | Cenegy | 427/140 |
| 4,604,445 | 8/1986 | Kay et al. | 528/64 |
| 4,680,203 | 7/1987 | Maki et al. | 427/393.6 |
| 4,689,268 | 8/1987 | Meader, Jr. | 428/413 |

FOREIGN PATENT DOCUMENTS 927642  6/1973  Canada.

OTHER PUBLICATIONS

Brochure entitled "Bayer Engineering Polymers": (apparently dated Nov., 1985).

Technical brochure on "352-Oldopren-S", (apparently dated Mar., 1983).

Article—"Field Performance of Experimental Bridge Deck Membrane Systems in Vermont", Transportation Research Record, pp. 57-65, (1984), R. I. Frascoia.

Article by A. L. Meader, Jr. et al.—"Development of a Cold-Poured Bridge Deck Membrane System", ASTM Special Technical Publications N. 629, pp. 164-177, (1976).

Article, M. D. McDonald—"Concrete Bridge Deck Waterproofing Systems: in Highways and Road Construction", pp. 26-30, (Aug., 1973).

Technical Bulletin, "Hycar Reactive Liquid Polymers", B. F. Goodrich Co., (apparently dated Jul., 1986).

Technical Brochure on "352 Oldepren", (apparently dated Oct. 1986).

*Primary Examiner*—Morton Foelak
*Attorney, Agent, or Firm*—Charles A. Cross

[57] ABSTRACT

Novel polyurethane formulations especially useful as membranes for the protection of bridge deckings. The polurethane is prepared by mixing two components, A and B. Component A consists essentially of a low-molecular weight polyol, e.g., glycerol; a poly(oxypropylene) triol; and an elastomer. Component B is a special MDI, either a mix of 4,4'- and 2,4'-isomers of diphenylmethane diisocyanate or a mix of 4,4'-diphenylmethane diisocyanate and its reaction product with a low molecular weight poly(oxypropylene).

18 Claims, No Drawings

POLYURETHANE COATINGS FOR BRIDGE DECKINGS AND THE LIKE

RELATED APPLICATIONS

This is a division of application Ser. No. 141,452, filed Jan. 7, 1988 now U.S. Pat. No. 4,788,269.

Said Ser. No. 141,452 is, in turn, a continuation-in-part of our copending application having U.S. Ser. No. 128,956, filed Dec. 4, 1987, now abandoned.

Copending application having U.S. Ser. No. 101,215, filed Sept. 25, 1987, discloses and claims polyurethane resins similar to those herein.

FIELD OF THE INVENTION

The invention relates to protection of exterior surfaces, especially concrete surfaces.

BRIEF SUMMARY OF THE INVENTION

A novel polyurethane resin is applied to exterior surfaces, especially concrete surfaces subject to stress due to vehicular traffic, weather, temperature-induced dimensional changes, and the like. The invention resin is especially useful as a coating for concrete bridge deckings where asphalt is to be laid on the decking. The resin is applied as a mixture of two components, viz., (A) a polyol component and (B) a modified MDI (diisocyanate) component.

Component A consists essentially of (i) a low-molecular weight polyol, e.g., glycerol, (ii) a poly(oxypropylene) triol, and (iii) optionally an elastomer. Component B is one of two especially modified MDI's. Either Component A or B may include a polyurethane catalyst. However, in some cases no catalyst is used, and in fact (as hereinafter explained) an inhibitor may be used.

BACKGROUND OF THE INVENTION

Concrete bridge deckings are commonly coated with a protective layer of asphalt (up to 6 cm thick), uniformly spread under heavy rolling equipment, which may weigh 10 metric tons or more. This asphalt layer is exposed to extremes of weather throughout the year, and will eventually develop cracks, some so small as to be practically invisible, others much larger. All are harmful, in that they permit liquid water to penetrate down to the concrete surface, where it freezes in winter and causes sizable portions of the asphalt layer to spall away. Alkali from the concrete accelerates asphalt deterioration. These adverse factors (freeze-shattering, traffic impact, chloride disintegration from de-icing salt, etc.) result in serious damage to the concrete traffic surface and eventually require major repairs.

Aside from asphalt-coated concrete surfaces, bridge concrete in the form of superstructure, parapets, crash barriers, etc., is also subject to attack, viz., from air- or moisture-borne industrial chemicals; spattered de-icing salt; and carbonation, i.e., gradual penetration of atmospheric carbon dioxide which then reacts with the alkaline materials in the concrete and attacks reinforcement in the concrete.

To inhibit the aforesaid destruction, it is conventional in concrete bridge construction and maintenance to apply a bridge deck membrane (BDM) to the concrete surface before laying down asphalt. Several BDM's are available. Polyvinylchloride is a typical conventional commercial coating. Polyurethane has been tried.

A BDM should meet a number of technical and economic criteria. It should:

(1) be impermeable to liquid water from above, yet be sufficiently permeable to permit small amount of water vapor to escape from the concrete substrate;
(2) be solventless;
(3) be easily applied, preferably sprayable;
(4) have good adhesion to concrete;
(5) have low chloride penetration;
(6) be stable to concrete alkali;
(7) be stable under conditions of asphalt application—hard, but not brittle, yet be sufficiently flexible to cope with dimensional changes generated by temperature differentials and bridge movements; be able to tolerate application of asphalt at 170° under a 10-ton roll;
(8) be resistant to asphalt migration (i.e., tendency of low molecular weight hydrocarbons in asphalt to migrate into the BDM, weakening and/or destroying it).
(9) have low raw material costs;
(10) not discolor concrete;
(11) have prolonged life on exposed surfaces (e.g., vertical surfaces and other surfaces not asphalt-coated);
(12) be tough enough within a reasonable time for construction crews to walk on it.

In a brochure entitled "Bayer Engineering Polymers: (apparently dated November, 1985), Bayer UK Limited offers commercially a polyurethane made from a polyether polyol (Component A) and a modified MDI (Component B). The composition is not further given. The two components are mixed at the site, e.g., by spraying, on bridge decking or other concrete surface. The applied resin is said to cure tack-free in a few minutes and can be walked on in 20–30 minutes.

In a technical brochure on "352-Oldopren-S" (apparently dated March, 1983), Buesing & Fasch GmbH.& Co. of Oldenburg, Germany, describe an MDI-based 2-component, polyurethane that provides an elastic film, useful (under asphalt) on road- and bridge-concrete surfaces.

R. I. Frascoia describes the use of four polyurethane membranes in bridge deck systems in an article, "Field Performance of Experimental Bridge Deck Membrane Systems in Vermont", Transportation Research Record, pp. 57–65 (1984). Three of the polyurethanes were asphalt-modified. Formulations are not otherwise given. Bond between bituminous pavement and membrane was rated "Poor", but overall performance was rated "Fair to Good".

Use of an "asphalt-extended urethane membrane" is described in an article by A. L. Meader, Jr. et al, "Development of a Cold-Poured Bridge Deck Membrane System", ASTM Special Technical Publications N 629, pp. 164–177 (1976).

For a good review article, especially for UK practice, see M. D. McDonald, "Concrete Bridge Deck Waterproofing Systems: in Highways and Road Construction, pp. 26–30 (August 1973). According to the article, polyurethane is blended with pitch to improve low-temperature flexibility and to reduce raw material costs; the membrane may need an epoxy primer (on concrete) and may need a surface protective layer before rolling on the final asphalt coating. "Cracking" and "chisel" tests are described.

In a technical bulletin, "Hycar Reactive Liquid Polymers" released by B.F. Goodrich Co. (apparently dated March, 1981), Hycar polymer is described as an acrylonitrile-based diol that can be reacted with MDI to provide low temperature flexibility and chemical resistance.

U.S. Pat. No. 4,608,203 (1987) discloses a polyurethane coating for bridge concrete, prepared from polyols and MDI. The polyols can be a mixture of poly(propylene oxide) (col. 1, line 65), glycerine (col. 2, line 3), and acrylonitrile-butadiene copolymer (col. 2, line 35).

U.S. Pat. No. 4,689,268 (1987) discloses a 3-layer laminate on concrete, viz., epoxy resin plus filler, a bonding agent, and a polyurethane.

U.S. Pat. No. 4,559,239 (1985) describes a 2-component (polyol-MDI) polyurethane applicable to concrete.

U.S. Pat. No. 3,725,355 discloses glycerine, polyether polyol, and an isocyanate prepolymer. The polyol can be a triol and must have a molecular weight of at least 2,000.

U.S. Pat. No. 4,507,336 (1985) describes a 2-component ("A" and "B") polyurethane, sprayable as a roof coating. "A" is (e.g.) a liquid modified MDI plus a chlorinated paraffin; "B" comprises (e.g.) a polypropylene glycol, 1,4-butanediol, and dibutyltin dilaurate catalyst.

Canadian Pat. No. 927,642 (1973) describes applying a polyurethane foam directly to a roadbed (not to concrete), followed by a bitumen layer on the polyurethane foam.

The combination of MDI and poly(propylene oxide) triol is disclosed, e.g., in U.S. Pat. Nos. 3,515,699, 4,532,316, and 4,604,3445. The combination of glycerol and poly(propylene oxide) triol is disclosed in U.S. Pat. Nos. 3,993,576 and 4,410,597, and the combination of MDI and glycerol in 4,145,515. Glycerol, poly(propylene oxide) triol, and MDI are disclosed in U.S. Pat. Nos. 4,225,696, 4,376,834, 4,436,896, and 4,551,498. In each of the above references our individual reactants appear in lists that are generally long and comprehensive (i.e., in so-called "shot-gun" disclosures). Aside from reactant ratios (crucial in our invention), the permutative possibilities of the reference lists run into the hundreds of thousands, perhaps millions, with no suggestion as to how to select our special combination from the myriad possibilities.

DESCRIPTION OF CERTAIN OF OUR COMPONENTS

PAPI® 94 is a mixture, consisting essentially of 60–70% (i) and 30–40% (ii), wherein (i) is a mixture of two MDI isomers, viz., about 90% of 4,4'-diphenylmethane diisocyanate and 10% 2,4'-diphenylmethane diisocyanate; and (ii) is polymeric MDI, viz.,

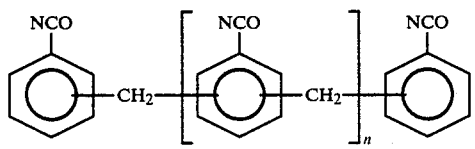

having a functionality of 2.3, wherein n is a variable in the range of 1 to 3.

Mondur XP-744 is a modified MDI. It can be made by reacting together diphenylmethane 4,4'-diisocyanate (MDI) with a poly(oxypropylene) glycol of the formula:

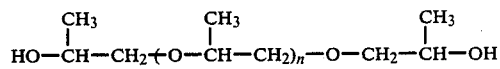

The value of n lies between 0 and 3, approximately indicating that the material is a mixture, probably with small amounts of higher and lower molecular weight polymers of the same genus. In the main reaction the MDI end-caps both ends of the poly(oxypropylene) glycol. The prepolymer thus formed may also contain small amounts of other products of the reaction, containing isocyanate and/or hydroxyl groups. The prepolymer is typically $K-O-(CH_2CH[CH_3]O)_m-K$, where K is

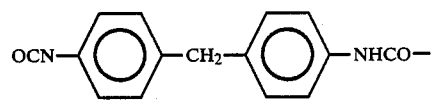

and m is about 2–5. In general, this material may be described as an MDI/polyisocyanate material comprising about 45–50 weight % MDI with the balance being the described prepolymer, i.e., with some prepolymer molecules being relatively small and others larger (depending generally on the amount of capped polyoxypropylene), but with the averages being substantially as above enumerated.

Whereas MDI is a solid, and is very difficult to handle in spray apparatus, the above described MDI/polyisocyanate prepolymer is a homogeneous liquid and is readily sprayed. It is available as Mondur XP-744 from Mobay Corporation.

Hycar 1300X17 is a long chain acrylonitrilebutadiene hydroxyl-terminated diol (copolymer with 17% acrylonitrile) available from B.F. Goodrich Co., Cleveland, Ohio. Weight average molecular weight is about 4,000, viscosity, 140,000 cp; hydroxyl number, 25 mg KOH/g; residual carboxyl acid number, 3.9.

NIAX LG-168—or simply LG-168, is a poly(oxypropylene) triol. It contains only secondary hydroxyl groups and has an average molecular weight of about 1,000; available from Union Carbide Corp.

DETAILED DESCRIPTION OF THE INVENTION

Our polyurethane resin is formed basically of two components; identified for the sake of brevity as (A) and (B). (A) is the mix of polyols. B is the polyisocyanate.

(A) consists essentially of (i) a low-molecular weight polyol with at least 3 hydroxyl groups and having a molecular weight between 92 and about 200; (ii) a poly(oxypropylene) triol (herein PPT), and optionally (iii) an elastomer preferably but not necessarily with functional groups such as hydroxyl, amino, active hydrogen, etc., capable of reacting with polyisocyanate, suitably an elastomeric diol.

Representative of suitable low molecular weight polyols (with molecular weights) are:
Glycerol (92) (preferred)
Butanetriol-1,2,3 (106)
Trimethylolethane (120)
Pentaglycerol (120)
Erythritol (122)
Trimethylolpropane (134)
Pentaerythritol (136)

Triethanolamine (149)
Triethanolpropane (176)

PPT contains only secondary hydroxyl groups and has an average molecular weight of about 500–3,000, and preferably about 1,000. PPT is available commercially from various sources, e.g., as NIAX LG-168 from Union Carbide Corp.

The elastomer can be a material of the group; natural rubber, epoxidized natural rubber, ethylene-propylene rubber, nitrile rubber, styrene-butadiene rubber, acrylic elastomers, butyl rubber, chlorosulfonated polyethylene, neoprene, polybutadiene, polyisoprene, and the like. We prefer an acrylonitrile-butadiene copolymer (such as Hycar 1300X17, as above described).

Catalyst/No Catalyst/Inhibitor

Our formulations can be used with or without a catalyst, depending on the method of the application. If the formulation is sprayed or otherwise applied in such manner that the two components are admixed at the point of application, a catalyst may be desirable to ensure quick setting, i.e., dry-to-touch within minutes. On the other hand, where the components are mixed in a container, and the container is required to supply the complete polyurethane formulation over a period of time (say, 30 minutes); then, not only is a catalyst inadvisable: an inhibitor may actually be necessary for the desired extended pot life. An inhibitor is used in Examples 2 and 3 below, where the complete formulation can be made up in a container for application to concrete by rolling onto the concrete surface with a conventional brush, squeegee, or roller. A number of polyurethane inhibitors are known, including: organic and inorganic acids, such as benzoyl chloride, p-toluene sulfonic acid, formic acid, acetic acid, benzoic acid, phosphoric acid, hydrochloric acid, and the like.

When an inhibitor is used, it is suitably about 0.01–1.0 weight % of the overall polyurethane mix.

A catalyst is recommended for spraying operations or where the formulation is to be applied to concrete immediately on mixing. For this purpose, substantially any of the conventional polyurethane catalysts (and combinations) can be used.

These catalysts include:
Tertiary amines:
Triethylene diamine
N-methyl morpholine
N-ethyl morpholine
Diethyl ethanolamine
1-methyl-4-dimethylamino ethyl piperazine
3-methoxy-N-dimethyl propyl amine
N-dimethyl-N'-methyl isopropyl propylene diamine
N,N-diethyl-3-diethyl amino propylamine
N,N-dimethyl benzyl amine
Dicyclohexylmethylamine
2,4,6-tris dimethylaminomethylphenol
N,N-dimethyl cyclohexylamine
Triethylamine
Tri-n-butylamine
1,8-diaza-bichloro[5,4,0]-undecene-7
N-methyl diethanolamine
N,N-dimethyl ethanolamine
N,N-dimethyl cyclohexylamine
N,N,N'N'-tetramethyl-ethylene diamine
1,4-diaza-bicyclo-[2,2,2]-octane
N-methyl-N'-dimethylaminoethyl-piperazine
Bis-(N,N-diethylaminoethyl)-adipate
N,N-diethylbenzylamine
Pentamethyldiethylene triamine
N,N,N'-tetramethyl-1,3-butanediamine
1,2-dimethylimidazole
2-methylimidazole Tin compounds:
Stannous chloride
Dibutyl tin di-2-ethyl hexoate
Stannous octoate
Dibutyl tin dilaurate
Trimethyl tin hydroxide
Dimethyl tin dichloride
Dibutyl tin diacetate
Dibutyl tin oxide
Tributyl tin acetate
Tetramethyl tin
Dimethyl dioctyl tin
Tin ethyl hexoate
Tin laurate
Dibutyl tin maleate
Dioctyl tin diacetate Other metal organics:
Zinc octoate
Phenyl mercuric propionate
Lead octoate
Lead naphthenate
Copper naphthenate As to the amount of catalyst(s), the preferred amount of tertiary amine catalyst is about 0.005–0.5%, based on the total weight of polyols plus polyisocyanate. When using a tin compound or other metal-containing catalyst, an equal amount is suitable. Mixtures of tertiary amines and organo-metallics are particularly suitable as catalysts for this invention.

Suitable ratios for certain components are:

TABLE I

|  | Workable Ranges Parts by Wt. | Preferred Ranges Parts by Wt. |
| --- | --- | --- |
| Component A |  |  |
| Glycerol | 3 to 10 | 6 to 7 |
| PPT | 80 to 120 | 90 to 110 |
| Elastomer | 0 to 60 | 10 to 50 |
| Molecular sieves | 0 to 80 | 10 to 50 |
| Component B |  |  |
| Modified MDI[1] | 60 to 110 | 65 to 100 |

[1]PAPI-94 or Mondur XP-744 as above described.

Generic and preferred embodiments of the invention include:
(1) the novel combination of Components A and B as set forth in generic and specific formulations herein;
(2) the processes (generic and specific) of mixing together Components A and B aforesaid;
(3) the resins (generic and specific) resulting from (2) above;
(4) process of coating a substrate with the resins of (3) above. Substrates of particular interest are metals and concrete, e.g., bridge decking.
(5) coated metal or concrete articles resulting from (4) above;
(6) overall process of protecting metals or concrete bridge decking by applying the resins of (3) above to metals or concrete, as the case may be;
(7) as an article, bridge decking comprising concrete-polyurethane-asphalt laminate, the polyurethane being the resin of (3) above.

Mixing and Application

For small batches, such as might be needed for minor repair work to decks and parapets, the two Components A and B can be mixed in an open container at room temperature, and the mixture can then be spread on the concrete surface. To extend pot life, it may be desirable to eliminate the catalyst, or even to use an inhibitor (cf. Examples 2 and 3 below). For general large scale work (and the resin is designed for this) a conventional two-liquid air spray gun gives best results.

Application to the deck surface is suitably made at ambient temperature, preferably above freezing. The coated substrate is tack-free within minutes and cures at ambient temperature.

It is preferred that the resin be applied to a dry surface. However, some dampness can be tolerated. Following conventional practice, we prefer to spray the surface with a primer.

We prefer to apply about 1–5 kg resin/meter$^2$ of surface. This makes a film of about 1–5 mm thickness. For deckings subject to extremely heavy traffic, we prefer the upper levels of these ranges.

The examples in TABLE II illustrate without limiting the invention.

form blisters in BDM's, especially in freshly laid membranes. The demoisturizing fillers can, however, be omitted, with acceptable results.

In the general case, and especially in humid conditions, molecular sieves should be added to the formulation when it is to be sprayed. The spray droplets tend to absorb atmospheric moisture, and this moisture reacts with the polyisocyanate to release carbon dioxide, which causes foaming in the membrane with consequent severe deterioration of properties in the cured membrane. Molecular sieves inhibit this foaming by absorbing moisture before it can react with the polyisocyanate component. When molecular sieves (or equivalent moisture absorber) is used, a suspending (thixotropic) agent is preferably used to maintain the molecular sieves in suspension. These materials are well known and are available commercially.

Roll-on Application of Example 3

Components A and B above were mixed together in a resin pot, and the resulting polyurethane resin was applied as a 3 mm coating to a concrete slab (simulating a bridge decking), with a roller. The coating was tack-free within a few hours and substantially cured within 24 hours. Its properties indicated that it could be walked

TABLE II

| Preferred Basic Formulations | Example 1 | Example 2 | Example 3 | Example 4 |
|---|---|---|---|---|
| | | (Parts by Weight) | | |
| Component A | | | | |
| Glycerine | 6.2 | 6.2 | 6.2 | 6.2 |
| PPT[1] | 100.0 | 100.0 | 100.0 | 100.0 |
| Catalysts | | | | |
| Dibutyl tin dilaurate | 0.104 | 0 | 0 | 0 |
| Triethylene diamine | 0.104 | 0 | 0 | 0 |
| Molecular sieves | 0 | 40.0 | 40.0 | 0 |
| Fumed silica[2] | 0 | 1.8 | 1.8 | 0–2 |
| Molecular sieves | | | | |
| In castor oil | 0 | 0 | 0 | 0–40 |
| Elastomer[3] | 0 | 25 | 25 | 0 |
| Component B | | | | |
| Modified MDI (PAPI-94) | 69 | 69 | 0 | 69 |
| Modified MDI (XP-744) | 0 | 0 | 94 | 0 |
| Benzoyl chloride[4] | 0 | 0.1 | 0.1 | 0 |
| Weight ratio glycerol:PPT: elastomer:Component B (approx.) | 1:16:0:11 | 1:16:4:11 | 1:16:4:15 | 1:16:0:11 |

[1]Poly(oxypropylene) triol, NIAX LG-168, above described.
[2]Thixotropic aid, available as Aerosil R-202, Degussa.
[3]Hycar 1300x17, above described.
[4]Inhibitor.

Explanation for TABLE II

Example 1 requires modification, depending on mode of application. If it is to be sprayed, molecular sieves should be added as in Examples 2, 3, or 4. If it is to be rolled onto the concrete, the catalysts should be omitted, and benzoyl chloride or other inhibitor added, as in Examples 2 and 3. Examples 2, 3, and 4 are preferred rollable formulations. They can be modified to be sprayable by addition of catalysts as in Example 1.

Fillers in the above formulations (molecular sieves and fumed silica) assist in viscosity control of the liquid polyurethane, aid in levelling the coating, and act as moisture absorbers. (See, e.g., U.S. Pat. No. 4,567,230 re molecular sieve moisture absorbers.) The moisture comes not from the resin, but rather from the underlying concrete and from the atmosphere. Even well-cured concrete tends to release water vapor, which tends to on within one day without damage, and that it would be able to withstand routine asphalt coating, several inches thick, applied at 170° C. and using a multi-ton roller. In addition, the membrane met the following tests:

Tests

Tests derived from the British Board of Agrement(B.B.A.):

Water vapor permeability (similar to ASTM E-96, Method B).

Resistance to chloride ion.

Cracking.

Resistance to water penetration (similar to ASTM E-96).

Resistance to chisel impact.

Resistance to ball indentation.

Resistance to aggregate indentation.

Tensile bond (adhesion)

Test originating in laboratories outside the B.B.A.: Asphalt migration.

Certain of the above tests are summarized below.

So far as we are aware, there are no official requirements (whether at the national or state level) for polyurethane or other BDM's. However, the construction industry has come to expect certain properties, and the chemical industry has attempted to meet these expectations. Such parameters have on occasion been offered as guidelines, as distinct from requirements. In general, the tests, however, defined and formulated, aim at demonstrating properties that meet practical problems of actual road use, as elsewhere delineated. Some of the tests have been developed by semi-official agencies (e.g., the British Board of Agrement), some by the construction industry, some by the American Society for Testing Materials (ASTM), and some by suppliers of polyurethane components.

The following, for example, are summarized from Appendix B, Department of Transport Checks and Tests for the Approval of Waterproofing Systems for Concrete Decks to Highway Bridges, published by the British Board of Agrement, and speaks as of 1987:

(1) Water vapor permeability. (Test per British Standards 3177:1959.) Permeability of air at 25° C. and 75% relative humidity should not exceed 15 g/m²/day per mil of film.

(2) Resistance to chloride ion. Concentrated NaCl solution on upper side of membrane, distilled water on lower. After 7 days no Cl ion penetration as shown by silver nitrate added to lower container.

(3) Cracking test. Concrete slab is coated, then pressure applied incrementally from the other side to crack the slab. It is desirable that the crack in the slab reach 2.5 mm before fracturing the coating to create a visible 12 mm-long fracture in the coating.

(4) Resistance to water penetration. Samples supported on gauze are subjected to 6,010 kg/m² water pressure for 24 hours without penetration.

(5) Resistance to chisel impact. Total of 40 impacts in different positions, at 20° C. and 0° C., with a chisel weighing 1 kg, with head 20 mm wide and 90° tip angle, dropped in guides. Aim is less than 5% punctures.

(6) Tensile bond. 150 mm square samples applied to concrete blocks, then steel plates adhered to upper surface. Load required to pull the membrane from the concrete should not be less than 1,200N.

(7) Resistance to indentation (ball). Sample 200 mm×200 mm bonded to steel plate, then 20 mm-diameter steel ball pressed into sample for 5 minutes at 1,800N; a 5 mm-ball is similarly pressed at 400N. Penetration to the plate is determined by addition of salt solution to the indentation and attempted passage of electric current (1,000 v) therethrough. With replications. The polyurethane should not be penetrated.

(8) Aggregate indentation. 150 mm square sample of polyurethane on concrete slab is topped with a layer of 14–22 mm crushed granite aggregate and a load of 5,625 kg is applied for 5 minutes. The polyurethane should not be penetrated.

Asphalt Migration

Dip coupon with 2 mm-polyurethane coating in asphalt at 175° C. for 1 hour. Recover, determine by visual inspection whether asphalt has migrated into the polyurethane, or whether coating is embrittled, is discolored, or has otherwise deteriorated.

Some of our tests point to seemingly contradictory requirements; for example, the perfect membrane should be tough and hard, permitting the overlay of hot asphalt by heavy equipment, but at the same time the membrane must be sufficiently flexible and elastic so that if the underlying concrete cracks, the membrane will not likewise crack. Perhaps the perfect membrane does not exist. Our preferred formulations, on the other hand, meet major requirements.

Besides molecular sieves and thixotropic agents, we can also add antioxidants, reinforcing agents, plasticizers, UV stabilizers, pigments, fillers, and corrosion inhibitors, in amounts ranging from about 0.01 to 25% by weight of the total composition.

Percentages are by weight unless otherwise stated.

We claim:

1. Process of coating a substrate comprising applying thereto a polyurethane resin, said resin being the product obtained by reacting together Component A and Component B of a composition consisting essentially of two separate components, A and B;

Component A consisting essentially of, in parts by weight, a low-molecular weight polyol having at least 3 hydroxyl groups and a molecular weight between 92 and about 200, about 3–10 parts; a poly(oxypropylene) triol containing only secondary hydroxyl groups, molecular weight about 500 to 3,000, 80–120 parts; and an elastomer, 0–60 parts;

Component B, about 60–110 parts; being a polyisocyanate of the group consisting of (i) a mixture consisting essentially of (a) and (b), wherein (a) is a mixture of 4,4'-diphenylmethane diisocyanate and 2,4'-diphenylmethane diisocyanate; and (b) is polymeric MDI, viz.,

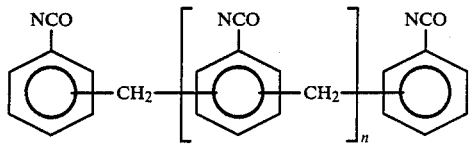

having a functionality of 2.3, wherein n is a variable in the range of 1 to 3 ; and (ii) a polyisocyanate material comprising about 45'50 weight % 4,4'-diphenylmethane diisocyanate and balance to make 100% of a polyisocyanate of the structure K-O-(CH$_2$CH[CH$_3$]O)$_m$-K, where K is

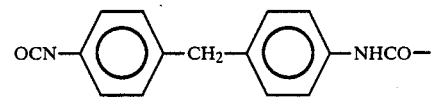

and m is about 2–5.

2. Process according to claim 1 wherein the resin is the product obtained by reacting together Component A and Component B of said composition wherein, in parts by weight Component A consists essentially of:
  (i) glycerol, about 6.2;
  (ii) poly(oxypropylene) triol, about 100;
  (iii) elastomeric diol, about 25;
  (iv) molecular sieves, about 40; and
  (v) fumed silica, about 1.8; and Component B consists essentially of:
  (i) benzoyl chloride, about 0.1; and (ii) group member (ii), about 94 parts.

3. Process according to claim 1 wherein the resin is the product obtained by reacting together Component A and Component B of said composition wherein, in parts by weight
Component A consists essentially of:
(i) glycerol, about 6.2;
(ii) poly(oxypropylene) triol, about 100;
(iii) elastomeric diol, about 25;
(iv) molecular sieves, about 40; and
(v) fumed silica, about 1.8; and
Component B consists essentially of:
(i) benzoyl chloride, about 0.1; and
(ii) about 69 parts group member (i), wherein (i) consists essentially of about 60-70% (a) and about 30-40% (b), wherein (a) consists essentially of about 90% 4,4'-diphenylmethane diisocyanate and about 10% 2,4'-diphenylmethane diisocyanate.

4. Process according to claim 1, 2 or 3 wherein the substrate is concrete.

5. Process according to claim 1, 2 or 3 wherein the substrate is metal.

6. Process according to claim 4 wherein the concrete is bridge decking.

7. Article comprising a substrate and a film coating adhered thereon, said film coating comprising the resin obtained by reacting together Component A and Component B of a composition consisting essentially of two separate components, A and B;
Component A consisting essentially of, in parts by weight, a low molecular weight polyol having at least 3 hydroxyl groups and a molecular weight between 92 and about 200, about 3-10 parts; a poly(oxypropylene) triol containing only secondary hydroxyl groups, molecular weight about 500 to 3,000, 80-120 parts; and an elastomer, 0-60 parts;
Component B, about 60-110 parts, being a polyisocyanate of the group consisting of (i) a mixture consisting essentially of (a) and (b), wherein (a) is a mixture of 4,4'-diphenylmethane diisocyanate and 2,4'-diphenylmethane diisocyanate; and (b) is polymeric MDI, viz.,

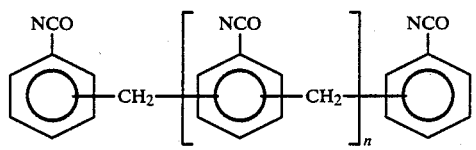

having a functionality of 2.3, wherein n is a variable in the range 1 to 3; and (ii) a polyisocyanate material comprising about 45-50 weight % 4,4'-diphenylmethane diisocyanate and balance to make 100% of a polyisocyanate of the structure K-O-(CH$_2$CH[CH$_3$]O)$_m$-K, where K is

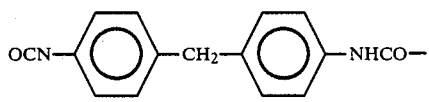

and m is about 2-5.

8. Article according to claim 7 wherein the resin is obtained by reacting together Component A and Component B of said composition wherein, in parts by weight
Component A consists essentially of:
(i) glycerol, about 6.2;
(ii) poly(oxypropylene) triol, about 100;
(iii) elastomeric diol, about 25;
(iv) molecular sieves, about 40; and
(v) fumed silica, about 1.8; and
Component B consists essentially of:
(i) benzoyl chloride, about 0.1; and
(ii) group member (ii), about 94 parts.

9. Article according to claim 7 wherein the resin is obtained by reacting together Component A and Component B of said composition wherein, in parts by weight
Component A consists essentially of:
(i) glycerol, about 6.2;
(ii) poly(oxypropylene) triol, about 100;
(iii) elastomeric diol, about 25;
(iv) molecular sieves, about 40; and
(v) fumed silica, about 1.8; and
Component B consists essentially of:
(i) benzoyl chloride, about 0.1; and
(ii) about 69 parts group member (i), wherein (i) consists essentially of about 60-70% (a) and about 30-40% (b), wherein (a) comprises about 90% 4,4'-diphenylmethane diisocyanate and about 10% 2,4'-diphenylmethane diisocyanate.

10. Article according to claim 7, 8 or 9 wherein the substrate is concrete.

11. Article according to claim 7, 8 or 9 wherein the substrate is metal.

12. Article according to claim 10 wherein the concrete substrate is bridge decking.

13. Process of aiding in the protection of concrete bridge decking from damage due to traffic, road salt, weather, and associated injury-sources, wherein a polyurethane membrane is applied to the surface of the concrete decking followed by an asphalt layer; characterized in that the polyurethane is the resin obtained by reacting together Component A and Component B of a composition consisting essentially of two separate components, A and B;
Component A consisting essentially of, in parts by weight, a low molecular weight polyol having at least 3 hydroxyl groups and a molecular weight between 92 and about 200, about 3-10 parts; a poly(oxypropylene) triol containing only secondary hydroxyl groups, molecular weight about 500 to 3,000, 80-120 parts; and an elastomer, 0-60 parts;
Component B, about 60-110 parts, being a polyisocyanate of the group consisting of (i) a mixture consisting essentially of (a) and (b), wherein (a) is a mixture of 4,4'-diphenylmethane diisocyanate and 2,4'-diphenylmethane diisocyanate; and (b) is polymeric MDI, viz.,

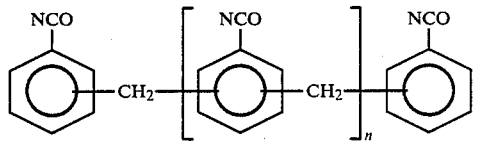

having a functionality of 2.3, wherein n is a variable in the range of 1 to 3; and (ii) a polyisocyanate material comprising about 45-50 weight % 4,4'- diphenylmethane diisocyanate and balance to make 100% of a polyisocyanate of the structure K-O-(CH$_2$CH[CH$_3$]O)$_m$-K, where K is

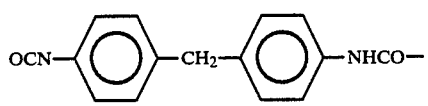

and m is about 2-5.

14. Process according to claim 10, wherein the resin is the product obtained by reacting together Component A and Component B of said composition wherein, in parts by weight
   Component A consists essentially of:
   (i) glycerol, about 6.2;
   (ii) poly(oxypropylene) triol, about 100;
   (iii) elastomeric diol, about 25;
   (iv) molecular sieves, about 40; and
   (v) fumed silica, about 1.8; and
   Component B consists essentially of:
   (i) benzoyl chloride, about 0.1; and
   (ii) group member (ii), about 94 parts.

15. Process according to claim 10 wherein the resin is the product obtained by reacting together Component A and Component B of said composition wherein, in parts by weight
   Component A consists essentially of:
   (i) glycerol, about 6.2;
   (ii) poly(oxypropylene) triol, about 100;
   (iii) elastomeric diol, about 25;
   (iv) molecular sieves, about 40; and
   (v) fumed silica, about 1.8; and
   Component B consists essentially of:
   (i) benzoyl chloride, about 0.1; and
   (ii) about 69 parts group member (i), wherein (i) consists essentially of about 60-70% (a) and about 30-40% (b) wherein (a) comprises about 90% 4,4'-diphenylmethane diisocyanate and about 10% 2,4'-diphenylmethane diisocyanate.

16. Article comprising concrete bridge decking having applied thereon a layer of polyurethane resin obtained by reacting together Component A and Component B of a composition consisting essentially of two separate components, A and B;
   Component A consisting essentially of, in parts by weight, a low molecular weight polyol having at least 3 hydroxyl groups and a molecular weight between 92 and about 200, about 3-10 parts; a poly(oxypropylene) triol containing only secondary hydroxyl groups, molecular weight about 500 to 3,000, 80-120 parts; and an elastomer, 0-60 parts;
   Component B, about 60-110 parts, being a polyisocyanate of the group consisting of (i) a mixture consisting essentially of (a) and (b), wherein (a) is a mixture of 4,4'-diphenylmethane diisocyanate and 2,4'-diphenylmethane diisocyanate; and (b) is polymeric MDI, viz.,

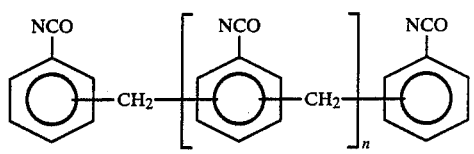

having a functionality of 2.3, where n is a variable in the range of 1 to 3; and (ii) a polyisocyanate material comprising about 45-50 weight % 4,4'-diphenylmethane diisocyanate and balance to make 100% of a polyisocyanate of the structure K-O-(CH$_2$CH[CH$_3$]O)$_m$-K, wherein K is

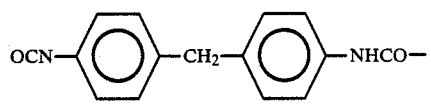

and m is about 2-5.; plus a layer of asphalt on the resin layer.

17. Article according to claim 13 wherein the resin is the product obtained by reacting together Component A and Component B of said composition where, in parts by weight
   Component A consists essentially of:
   (i) glycerol, about 6.2;
   (ii) poly(oxypropylene) triol, about 100;
   (iii) elastomeric diol, about 25;
   (iv) molecular sieves, about 40; and
   (v) fumed silica, about 1.8; and
   Component B consists essentially of:
   (i) benzoyl chloride, about 0.1; and
   (ii) group member (ii), about 94 parts.

18. Article according to claim 13 wherein the rsin is the product obtained by reacting together a composition wherein, in parts by weight
   Component A consists essentially of:
   (i) glycerol, about 6.2;
   (ii) poly(oxypropylene) triol, about 100;
   (iii) elastomeric diol, about 25;
   (iv) molecular sieves, about 40; and
   (v) fumed silica, about 1.8; and
   Component B consists essentially of:
   (i) benzoyl chloride, about 0.1; and
   (ii) group member (i), wherein (i) consists essentially of about 60-70% (a) and about 30-40% (b), wherein (a) comprises about 90% 4,4'-diphenylmethane diisocyanate and about 10% 2,4'-diphenylmethane diisocyanate.

* * * * *

UNITED STATES PATENT AND TRADEMARK OFFICE
CERTIFICATE OF CORRECTION

PATENT NO. : 4,855,185

DATED : August 8, 1989

INVENTOR(S) : Cung Vu, Susan P. Buxbaum, Norman E. Blank and Richard C. Hartwig

It is certified that error appears in the above-identified patent and that said Letters Patent is hereby corrected as shown below:

Claim 1, column 10, line 46: "45'50" should be -- 45-50 --.

Claim 14, column 13, line 11: "10" should be -- 13 --.

Claim 15, column 13, line 24: "10" should be -- 13 --.

Claim 17, column 14, line 26: "13" should be -- 16 --.

Claim 18, column 14, line 40: "13" should be -- 16 -- and "rsin" should be -- resin --.

Signed and Sealed this

Twenty-second Day of May, 1990

Attest:

HARRY F. MANBECK, JR.

Attesting Officer

Commissioner of Patents and Trademarks